Nov. 11, 1930.  C. H. DOCKSON  1,781,054
PRESSURE REGULATING VALVE
Filed Feb. 1, 1923   2 Sheets-Sheet 1
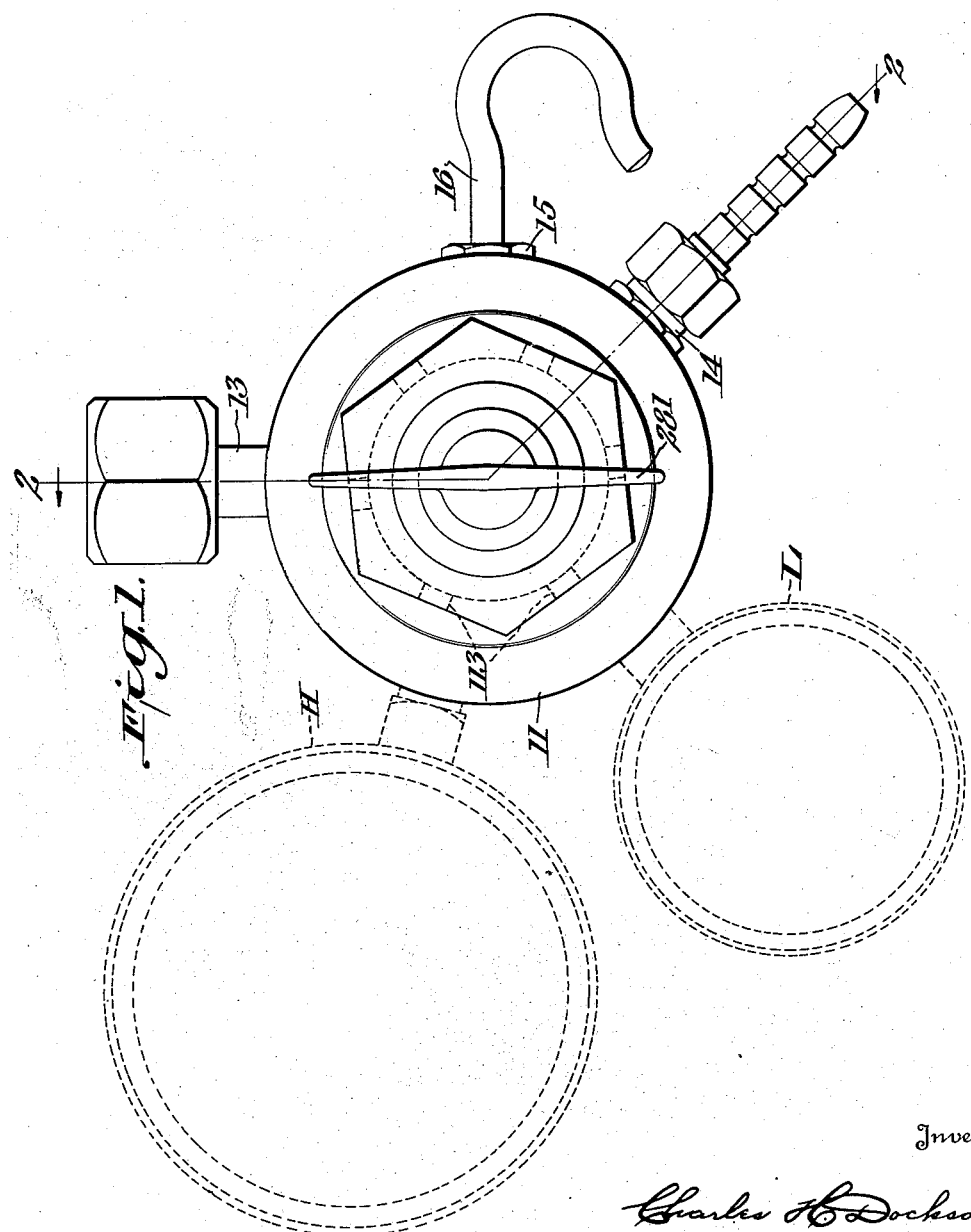

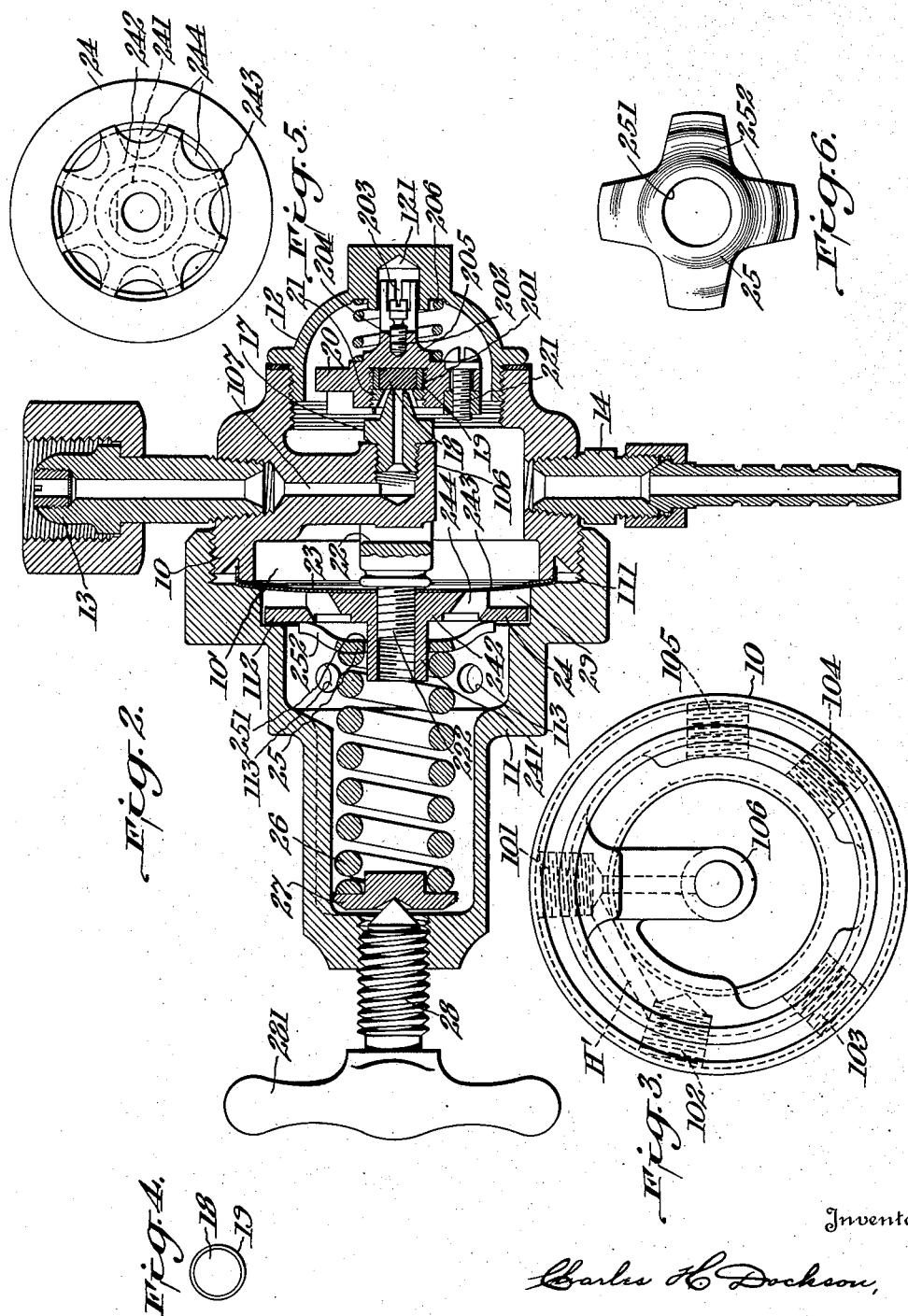

Patented Nov. 11, 1930

1,781,054

UNITED STATES PATENT OFFICE

CHARLES H. DOCKSON, OF DETROIT, MICHIGAN

PRESSURE-REGULATING VALVE

Application filed February 1, 1923. Serial No. 616,436.

This invention relates to fluid pressure regulating valves such as are used in reducing and regulating the gas pressure obtained from cylinders of gas under pressure and delivered to consuming devices such as blowpipes.

In pressure reducing valves as heretofore constructed the main body has been cast with bosses or lugs projecting outward beyond its outline, such bosses being tapped to receive inlet and outlet pipes and pressure gages. To finish the exterior of this type of body, special machining operations are necessary, which increase the cost of production. According to this invention the casing body is cast free from all exterior bosses so that it may be readily chucked and machined, thereby lessening its cost and producing a casing having a better appearance. The body of the casing may be drilled and tapped at proper points to receive the gas pipes and fittings.

The valve head usually comprises a hard rubber disc carried by a yoke suspended from a flexible diaphragm. Because of the looseness of the yoke, the valve chatters considerably during its operation and the impact of the disc against the inlet nozzle frequently breaks the disc. In the present invention means are provided whereby the yoke is steadied in its movements, greatly reducing the noise, and the valve disc is reinforced to reduce its liability to break. Sometimes an excessive pressure builds up in the valve. According to the present invention, this is relieved by an improved means for shearing the diaphragm at a predetermined high pressure.

The ratio of reduction of the gas pressure delivered to the valve is determined by the pressure on the diaphragm from which the seat-carrying yoke is suspended. According to the present invention, an improved adjusting means is provided for varying the pressure applied to the diaphragm and comprises a helical spring that bears against and is arranged in tandem with a cushion plate bearing against the diaphragm.

The above and other objects and novel features of the invention will be apparent from tures of the invention will be apparent from the following description taken with the accompanying drawings in which:

Fig. 1 is a plan view of a regulating valve embodying this invention;

Fig. 2 is a vertical sectional view of the same on line 2—2 of Fig. 1;

Fig. 3 is a plan view of the body of the valve casing;

Fig. 4 is a plan view of the valve seat assembly;

Fig. 5 is a bottom plan view of the diaphragm clamping plate; and

Fig. 6 is a plan view of the pressure adjusting cushion plate.

Referring to the drawings, the casing of the valve comprises a main hollow body 10 externally threaded at one end to receive a bonnet or front end cap 11 and internally threaded at the opposite end to receive a rear end cap 12. As shown in Figs. 2 and 3, the main body 10, which may be of brass, is cylindrical and entirely free from exterior bosses or lugs. It has heretofore been impracticable to machine and polish the outer surfaces of casing bodies because of the exterior bosses thereon, so the rough outer surface has been painted to give the body a finished appearance. The improved body 10 can be readily gripped by the usual lathe chuck and its outer surface can be turned down in a lathe to the desired dimensions and polished without special machining manipulations and without the additional painting, heretofore required. The body 10 may then be drilled and tapped as at 101, 102, 103, 104 and 105 to receive the various fittings of the valve. The usual or any suitable coupling connection 13 may be fitted into the opening 101 to mechanically couple the valve to an outlet connection on a gas storage cylinder and to lead the gas into the inlet extension 106 that extends into and is integral with the body 10. The usual high and low pressure gauges H and L may be coupled to the openings 102 and 103 the former communicating through a passage H' with the high pressure inlet opening 101 and the opening 103 communicating with the interior of the body 10. The opening 104 may receive the usual hose connection union nipple 14 which leads to the gas consuming device, such as a blowpipe, and the opening 105 may receive a plug 15 carrying a hook 16 upon which a blowpipe may be hung when not in use. Some compressed gas cylinders have convex heads with horizontal gas outlets whereas others have concave heads with vertical gas outlets. In order that the low-pressure gage, hose connection and hook may be located in their most desirable and handiest positions, these parts are interchangeable in the openings 103, 104 and 105.

The inward extension 106 has a gas inlet passage 107 and is threaded at its inner end to receive a fixed inlet nozzle 17 with which the valve disc 18 cooperates to regulate the admission of gas into the valve chamber 10'. The edges of the valve disc 18, which is desirably of material such as hard rubber, sometimes check or break off due to the impacts of the disc against the end of the nozzle 17. To reduce this breakage, it has been found desirable to support the periphery of the disc by enclosing it in a tubular metal shell 19, as illustrated in Fig. 4. The disc 18 and its reinforcing shell 19 are held in a threaded cavity 201 in a valve head holder 20 by a threaded retaining ring 21 which bears against the upper outer edge of the valve disc 18 and its reinforcing ring 19. The valve head holder 20 is secured by screws 221 to the rear end of a yoke 22 that is suspended from the diaphragm 23. Accordingly, as the pressure in the chamber 10' increases the diaphragm 23, the yoke 22 and the valve disc 18 will be raised to move the latter toward the end of the inlet nozzle 17 to regulate the admission of gas. The variations of the pressure in the chamber 10' vibrate the suspended yoke 22 which produces considerable chatter and noise. In order to reduce such vibration the valve head holder 20 has a projection or guide 202 on its lower side that extends into a socket 121 in the inside of the cap 12. This projection has longitudinal slots 203 through its axis and an axial socket 204 therein receives a screw 205 whereby the slotted ends of the projection may be spread to more closely fit the socket 121 and reduce the vibration. A spring 206 that bears against the inside of the cap 12 and against the valve seat holder 20 also assists in reducing vibration of the yokes.

The spring 206 and the gas pressure against the diaphragm 23 tend to move the seat 18 against the nozzle 17, but this tendency is counteracted by an adjustable pressure applied to the opposite side of the diaphragm. A shoulder 111 on the bonnet 11 clamps the peripheral edge of the diaphragm 23 against the front edge of the body 10 and a stem 222 of the yoke 22 projects through a central opening in the diaphragm and is engaged by a threaded clamping plate 24 to clamp the yoke and diaphragm together. Appropriate gaskets of lead or other suitable material may be inserted between the diaphragm and the parts to which it is clamped. The pressure against the diaphragm 23 is desirably applied through two yieldable members arranged in tandem. One of these members consists of a rockable pressure distributing spring cushion plate 25 which, as shown in Figs. 2 and 6, has a central opening 251 to fit the boss 241 of the clamping plate 24. The plate 25 is dished and may be recessed at intervals in its periphery to provide feet 252 which engage the upper surface of the clamping plate 24. A helical spring 26 at one end engages an annular portion on the upper side of the plate 25 and at its other end engages an anti-friction plate 27 that is engaged by an adjusting screw 28 threaded to fit a threaded opening in the bonnet 11 and provided with a handle 281 at its outer end. The springs 25 and 26 are of different strengths, so that momentary pressure variations may be taken up by the weaker cushion spring 25, and the valve will deliver a more constant gas pressure. The spring plate 25 balances the diaphragm against twisting forces, thus relieving the diaphragm and tending to cause the guide 202 to move smoothly in the socket 121. The adjustment of the handle 281 accordingly determines the delivery pressure in the chamber 10', which is registered on the gage L. As the gas is withdrawn from the chamber 10', the valve seat moves away from and toward the nozzle 17 to regulate the admission of gas.

It is desirable that some means be provided for relieving excessive pressure which may arise in the chamber 10'. The clamping plate 24 may consist of sections of two different diameters, the section 242 of smaller diameter engaging the upper side of the diaphragm and leaving a space 29 between its peripheral edge and the inside of the bonnet 11. The outer edge of the section 242 is desirably provided with shearing edges 243 to shear or puncture the diaphragm when it is pressed outwardly by the excessive pressure. These shearing edges are between openings 244 extending through the plate 24 at intervals in the periphery of the section 242. The plate 24 is so adjusted that it is normally spaced from the shoulder 112 on the inside of the bonnet 11, but when excessive pressure obtains in the chamber 10' the larger section abuts against the shoulder 112 and increased pressure causes the diaphragm 23 to be sheared by the edges 243 to release the pressure through the openings 244, and through openings 113 in the bonnet 11 to the atmosphere.

Certain features of the invention are of general application with other types of valves, and various details may be modified without departing from the spirit of the invention, which is therefore not limited to the exact construction shown and described.

I claim:—

1. In a pressure regulating valve for attachment to tanks containing gas under pressure, the combination of a casing member having a pressure chamber therein, the casing member having a plurality of identically formed and threaded openings disposed at an angle to the axis of the casing and communicating with the pressure chamber, an inlet nipple secured in one of said openings, an outlet nipple secured in another of said openings, and a pressure gage secured in another of said openings, the outlet nipple and the pressure gage being themselves of different contour but interchangeable in the latter openings, to enable the shape of the pressure regulating valve to be changed so that it can be used with different kinds of pressure tanks.

2. In a pressure regulating valve, the combination of a casing providing a chamber having an inlet and an outlet, said casing having a guide socket therein, a nozzle at the discharge end of said inlet, a valve disk cooperating with said nozzle, a pressure-responsive carrier for said disk having an expandible guide stem fitting in said socket and means for adjusting the expandible guide stem to obtain a snug but easy-sliding fit of the guide stem in the socket.

3. In a pressure regulating valve, the combination of a casing providing a chamber having an inlet and an outlet, said casing having a guide socket therein, a nozzle at the discharge end of said inlet, a yoke movable in response to pressure variations in said chamber, said yoke having a transversely slotted expandible guide stem movable in said socket, means for adjusting the expandible guide stem to obtain a snug but easy-sliding fit of the guide stem in the socket, and a valve disk secured to said yoke and cooperating with said nozzle.

4. In a pressure regulating valve, the combination of a casing providing a chamber having an inlet and an outlet, a nozzle at the discharge end of said inlet, a yoke movable in response to variations in pressure and having a threaded recess, a threaded retainer fitting in said recess, and valve means comprising a non-metallic disk held in said recess by said retainer and adapted to be seated against said nozzle, and a metal shell tightly fitting the periphery of said disk to prevent the breakage of the latter by impact against said nozzle, the threaded retainer being removable to permit the valve means to be replaced or reversed end for end when worn.

5. In a pressure regulating valve, the combination of a casing having an abutment therein, a diaphragm in said casing, and a movable plate between said abutment and said diaphragm having means adapted to shear or puncture said diaphragm to relieve excessive pressure in said casing.

6. In a pressure regulating valve, the combination of a casing having an abutment therein, a diaphragm in said casing, and a movable apertured plate between said abutment and said diaphragm having means engageable by said diaphragm to shear the latter and relieve excessive pressure in said casing.

7. In a pressure regulating valve, the combination of a casing having an abutment therein, a diaphragm in said casing, and a movable apertured plate between said abutment and said diaphragm comprising portions of different diameters leaving an annular space between the portion of larger diameter and said diaphragm, the portion of smaller diameter having means adapted to shear said diaphragm to relieve excessive pressure in said casing.

8. In a pressure regulating valve, the combination of a diaphragm, and means for applying pressure to said diaphragm comprising a resilient plate, an adjustable plate spaced therefrom, and a helical spring between and normally bearing against said plates.

9. In a pressure regulating valve, the combination of a diaphragm, and means for applying pressure to said diaphragm comprising a resilient plate having a movable outer peripheral edge portion, and an adjustable spring bearing against said plate.

10. In a pressure regulating valve, the combination of a diaphragm, and means for applying pressure to said diaphragm comprising an annular resilient plate having its outer periphery recessed at intervals, and an adjustable helical spring bearing against said plate within such recessed portion.

11. In a pressure regulating valve, the combination of a diaphragm, a valve-carrying member, means clamping said diaphragm to said member, and means for applying pressure to said diaphragm comprising a resilient plate bearing against such clamping means and a spring bearing against said plate.

12. In a pressure regulating valve, the combination of a diaphragm, a valve-carrying member, a plate clamping said diaphragm to said member having means adapted to shear said diaphragm to relieve excessive pressure in said casing, and means for applying pressure to said diaphragm comprising a resilient plate bearing against such clamping plate and an adjustable spring bearing against said resilient plate.

13. In a pressure regulating valve for use with various kinds of containers of gas under pressure, the combination of a casing providing a chamber having an inlet and threaded openings; a high pressure gage coupled in one of said openings; and a low pressure gage, an outlet nipple and a blowpipe supporting hook coupled in the remaining threaded openings, the low pressure gage, the outlet nipple and the hook being interchangeable in the openings, to enable the shape of the pressure reducing valve to be changed to conform to the peculiarities of different kinds of gas supplying containers.

14. In a pressure regulating valve, the combination of an expandible diaphragm, a spring opposing the expansion of the diaphragm, and a pressure distributing rocker between the spring and the diaphragm to balance the diaphragm against forces tending to twist it.

15. In a pressure regulating valve, the combination of an inlet having a valve seat, an expandible diaphragm, a valve head holder supported by the diaphragm and movable thereby to cause the valve head to seat, a guide on the valve carrier to direct the valve head squarely to its seat, a spring opposing the expansion of the diaphragm, and balancing means between the spring and the diaphragm to overcome twisting forces upon the diaphragm that would tend to cause the valve carrier to be swayed from side to side by the diaphragm.

16. In a pressure regulating valve, the combination of a chambered portion having an inwardly projecting shoulder, a diaphragm distortable by pressure in the chamber, and a member carried by the diaphragm comprising puncturing means spaced a substantial distance inward from the periphery of the diaphragm, said member being arranged to engage said shoulder and to arrest and puncture the diaphragm when the diaphragm is distorted beyond a predetermined safe limit, to relieve excessive pressure in the chamber.

In testimony whereof, I affix my signature.

CHARLES H. DOCKSON.